United States Patent
Selvaraj et al.

(10) Patent No.: US 9,236,085 B1
(45) Date of Patent: Jan. 12, 2016

(54) METHOD AND APPARATUS FOR PERFORMING A DEFECT PROCESS ON A DATA STORAGE DEVICE

(71) Applicant: Western Digital Technologies, Inc., Irvine, CA (US)

(72) Inventors: Gomez S. Selvaraj, Irvine, CA (US); William J. Seamon, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 102 days.

(21) Appl. No.: 13/781,374

(22) Filed: Feb. 28, 2013

(51) Int. Cl.
*G11B 20/18* (2006.01)

(52) U.S. Cl.
CPC .................................. *G11B 20/1816* (2013.01)

(58) Field of Classification Search
CPC ............ G06F 11/1076; G06F 11/1008; G06F 2211/1057; G11B 20/1833; G11B 20/1816; G11B 2220/2541; G11B 2007/0013; G11B 20/1883; G11B 2220/20; G11B 7/00375; G11B 7/00736; G11B 2020/1826; H05K 999/99
USPC .............................. 714/770, 8; 360/31, 53, 69
See application file for complete search history.

(56) References Cited

U.S. PATENT DOCUMENTS

| | | | |
|---|---|---|---|
| 6,025,966 A * | 2/2000 | Nemazie et al. | 360/53 |
| 6,560,055 B1 * | 5/2003 | Nemazie et al. | 360/53 |
| 6,564,345 B1 * | 5/2003 | Kim et al. | 714/723 |
| 6,985,319 B2 | 1/2006 | Yip et al. | |
| 8,014,245 B2 | 9/2011 | Chen et al. | |
| 8,040,625 B1 | 10/2011 | Boyle et al. | |
| 2001/0055172 A1 | 12/2001 | Yip et al. | |
| 2003/0179669 A1 * | 9/2003 | Takahashi et al. | 369/47.14 |
| 2004/0024753 A1 * | 2/2004 | Chane et al. | 707/3 |
| 2007/0053093 A1 * | 3/2007 | Allen et al. | 360/48 |
| 2007/0183074 A1 * | 8/2007 | Smith | 360/53 |
| 2007/0219312 A1 * | 9/2007 | David | 524/588 |
| 2007/0263313 A1 * | 11/2007 | Kitamura et al. | 360/69 |
| 2009/0034109 A1 * | 2/2009 | Paul et al. | 360/53 |
| 2010/0174955 A1 * | 7/2010 | Carnevale et al. | 714/718 |
| 2010/0226226 A1 * | 9/2010 | Watanabe et al. | 369/53.2 |
| 2011/0191628 A1 * | 8/2011 | Noguchi et al. | 714/6.2 |

* cited by examiner

*Primary Examiner* — Albert Decady
*Assistant Examiner* — Kyle Vallecillo

(57) ABSTRACT

A disk drive including a disk storing a defect log including one or more defect records, wherein each of the defect records spans multiple words and comprises chunks which are word aligned, each chunk comprising one or more record fields, and a controller configured to read the defect records on a word basis. A method for performing a defect process on the disk drive including selecting a defect record from the defect log, selecting record fields in the selected defect record, reading the selected defect record on a word basis, and searching the selected record fields which are located in a same chunk of the selected record at a same time to determine when the selected defect record matches a target defect record.

28 Claims, 4 Drawing Sheets

| Fields | Size (Bits) | Word |
|---|---|---|
| 114a { Cylinder | 20 | |
| Defect Wedge | 11 | 1 |
| Process Status/Margin | 1 | |
| 114b { Start Wedge | 12 | |
| End Wedge | 12 | 2 |
| Record Type | 8 | |
| 114c { Defect Start (Sector / ABA etc) | 16 | 3 |
| Defect End | 16 | |
| 114d { Defect Type (Multiplexed) | 4 | 4 |
| Flags | 28 | |
| 114e { Cluster ID | 16 | 5 |
| Fail Value | 16 | |
| 114f { Counter | 4 | |
| Fail ID | 8 | |
| PTM Index | 5 | 6 |
| PTM Count | 3 | |
| Reserved | 12 | |
| Total | 24 bytes | |

| Fields | Size (Bits) | Word |
|---|---|---|
| | | |
| Cylinder | 20 | |
| Defect Wedge | 11 | 1 |
| Process Status/Margin | 1 | |
| | | |
| Start Wedge | 12 | |
| End Wedge | 12 | 2 |
| Record Type | 8 | |
| | | |
| Defect Start (Sector / ABA etc) | 16 | 3 |
| Defect End | 16 | |
| | | |
| Defect Type (Multiplexed) | 4 | 4 |
| Flags | 28 | |
| | | |
| Cluster ID | 16 | 5 |
| Fail Value | 16 | |
| | | |
| Counter | 4 | |
| Fail ID | 8 | |
| PTM Index | 5 | 6 |
| PTM Count | 3 | |
| Reserved | 12 | |
| Total | 24 bytes | |

114a: Cylinder, Defect Wedge, Process Status/Margin
114b: Start Wedge, End Wedge, Record Type
114c: Defect Start, Defect End
114d: Defect Type, Flags
114e: Cluster ID, Fail Value
114f: Counter, Fail ID, PTM Index, PTM Count, Reserved

FIG. 4

METHOD AND APPARATUS FOR PERFORMING A DEFECT PROCESS ON A DATA STORAGE DEVICE

BACKGROUND

A disk drive comprises a disk which may contain defects from a manufacture of the disk or through wear and tear over time. Such defects may make portions of the disk unusable and are mapped in a defect log to prevent accidental storage of data in the defect. The defect may be a physical defect in the disk. In such a case, areas near the physical defect may also be considered to be a defect as a precautionary measure. The areas near the physical defect may therefore be margined and also be identified as a defect in the defect log.

To identify the defects, the defect log contains defect records. Each of the defect records contains record fields. In some situations such as during failure analysis, it may be beneficial to search for a specific defect record in the defect log, or many defect records which match certain search criteria. To search the defect records in the defect log, selected record fields in each of the defect records are searched to determine when the desired defect records have been found.

However, the defect records are read on a word by word basis and the record fields may span multiple words. Thus, multiple words of the defect record may need to be read, when the selected record fields span multiple words. Furthermore, multiple words may need to be read, even when only a single record field need be utilized, if the single record field spans multiple words. This can increase, for example, an amount of time needed to search the defect records in the defect log.

Furthermore, the record fields in the defect records may contain too little, or too much information for relevant failure analysis of the disk drive. Thus, the bits in the defect record may not be efficiently used. In such a case, each of the defect records in the defect log may utilize a large amount of space in the defect log, resulting in less defect records being stored in the defect log.

BRIEF DESCRIPTION OF THE DRAWINGS

The features and advantages of the present embodiments will become more apparent from the detailed description set forth below when taken in conjunction with the drawings, wherein:

FIG. 4 depicts a defect record according to an embodiment; and

DETAILED DESCRIPTION

Figure 1:
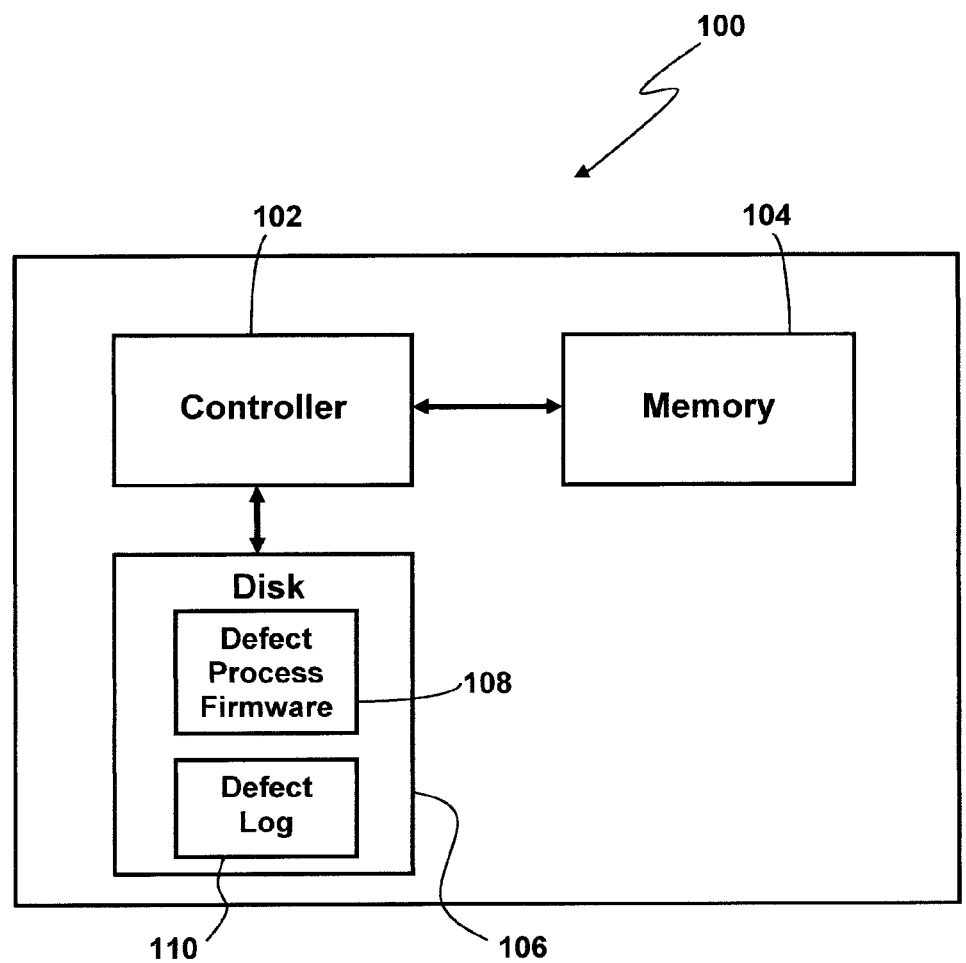
FIG. 1 depicts a disk drive including a disk storing a defect process firmware and a defect log according to an embodiment.

In an embodiment, as shown in FIG. 1, a disk drive 100 includes a controller 102, a memory 104, and a disk 106. In an embodiment, the disk 106 stores a defect process firmware 108 and a defect log 110. In an embodiment, the disk 106 is a persistent memory while the memory 104 is a non-persistent memory. In an embodiment, the disk 106 is a rotating disk such as a magnetic rotating disk. In an embodiment, the memory 104 is a random-access memory such as a DRAM.

Figure 2:
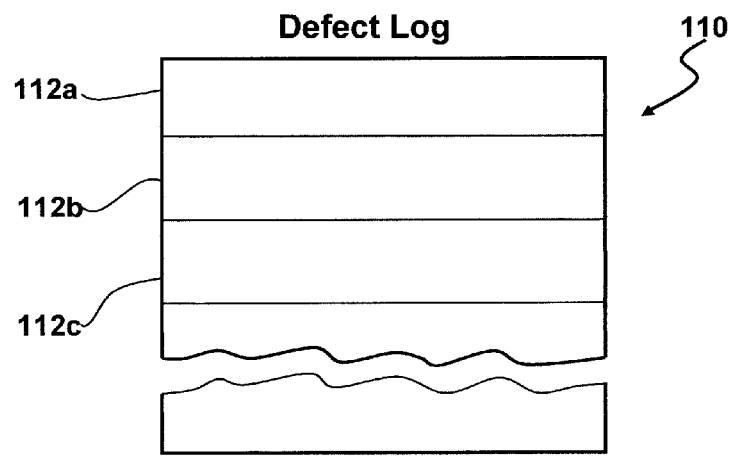
FIG. 2 depicts a defect log according to an embodiment.
Figure 3:
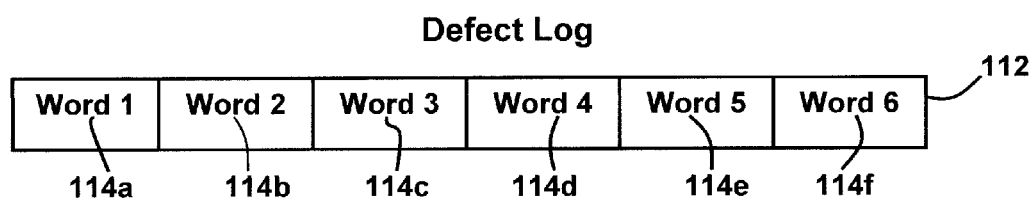
FIG. 3 depicts a defect record according to an embodiment.

In an embodiment, as shown in FIGS. 2 and 3, the defect log 110 includes defect records 112 such as defect records 112a, 112b, and 112c. In an embodiment, the defect records 112 form a linked list.

In an embodiment shown in FIG. 3, each of the defect records 112 include multiple chunks such as chunks 114a-114f. In an embodiment, the chunks 114a-114f can be data clusters. In the illustrated embodiment, each of the chunks 114a-114f are word aligned. In an embodiment, each of the chunks 114a-114f have a same bit size as a bit size of a word. Thus, as seen in FIG. 3, the chunk 114a is word aligned with word 1, the chunk 114b is word aligned with word 2, the chunk 114c is word aligned with word 3, the chunk 114d is word aligned with word 4, the chunk 114e is word aligned with word 5, and the chunk 114f is word aligned with word 6.

In an embodiment, a defect record 112 is shown in more detail in FIG. 4. As seen in FIG. 4, each of the chunks 114a-114f comprises one or more record fields. In an embodiment, record fields which are located in a same chunk are configured to be searchable at a same time.

The chunks 114a-114f have a 32 bit size, which is a same bit size as each of the words 1-6. In an embodiment, since there are 6 chunks, each defect record 112 comprises 6×32 bits=192 bits or 24 bytes. In an embodiment, the defect record 112 will thus have a reduced size. This can allow, for example, for more defect records to be stored in the defect log 110.

The chunk 114a comprises record fields such as a cylinder field, a defect wedge field, and a process status field. In an embodiment, the cylinder field comprises 20 bits, the defect wedge comprises 11 bits, and the process status field comprises 1 bit.

In an embodiment, the cylinder field indicates a cylinder of the defect while the defect wedge field indicates a defect wedge of the defect. In an embodiment, the process status field identifies when a defect record 112 corresponds to a defect that was not physically detected on the disk. For example, the defect record 112 may correspond to areas surrounding a defect that was physically detected on the disk, instead of the defect that was physically detected on the disk. Thus, the areas surrounding the defect that was physically detected on the disk 106 may have been margined as a defect. In an embodiment, this may be helpful in determining whether the defect record 112 corresponding to the defect may be removed from the defect log 110, such as in the case of excess margining.

The chunk 114b comprises record fields such as a start wedge field, an end wedge field, and a record type field. In an embodiment, the start wedge field comprises 12 bits, the end wedge field comprises 12 bits, and the record type field comprises 8 bits.

In an embodiment, the start wedge field indicates a start wedge of the defect while the end wedge field indicates an end wedge of the defect. In an embodiment, the record type field indicates features of the defect. Features of the defect can be, for example, skip track, tone scan elimination ("TSE") processed/unprocessed, enhanced defect management ("EDM"), or spare utilization. In an embodiment, the record type field can be utilized for defect record removal from the defect log 110. For example, the record type field may be used to improve yield by removing defect records 112 corresponding to margin records based on features of the defect in case of excess margins. Furthermore, the record type field may be helpful in implementing a reconfiguration process without reprocessing, improving a process to manipulate defect records 112 in runtime, and/or reducing test time in a defect record removing process with just a field check. In an embodiment, the reconfiguration process without reprocessing is a process whereby failed disk drives are reconfigured for use such as where the quality of the disk drive may be insufficient for a first standard, but sufficient for a second standard. In such a case, the defect management process may be reduced or may already be completed through the use of the record type field. In an embodiment, failure analysis on the disk 106 can be performed based at least partly on the record type field. In an embodiment, the defect records 112 can be sorted based on the features disclosed in the record type field.

The chunk 114c comprises record fields such as a defect start field and a defect end field. In an embodiment, the defect start field comprises 16 bits and the defect end field comprises 16 bits. In an embodiment, the defect start field indicates where the defect starts, while the defect end field indicates where the defect ends. The defect start field can comprise, for example, sector and/or absolute block address ("ABA") information.

The chunk 114d comprises record fields such as a defect type field and a defect flag field. In an embodiment, the defect type field comprises 4 bits and the defect flag field comprises 28 bits. In an embodiment, the defect type field is a multiplexed field specifying a flag field definition. In an embodiment, since the defect type field is multiplexed, it does not directly indicate the defect flags/types. Instead, the defect type field may be used with the flag field definition to indicate the defect flags/types. The flag field definition can be, for example, information related to a defect group. In an embodiment, since the defect type field comprises 4 bits, the defect type field can specify $2^4$=16 sets of information related to the defect group. In an embodiment, since the defect flag field comprises 28 bits, 28 flags are possible. Thus, in an embodiment, with 16 sets of information related to the defect group and 28 flags in each of the sets of information related to the defect group, a total of 448 defect flags/types can be indicated. In an embodiment, failure analysis on the disk 106 can be performed based at least partly on the defect type field and the defect flag field.

The chunk 114e field comprises record fields such as a cluster ID field and a fail value field. In an embodiment, the cluster ID field comprises 16 bits and the fail value field comprises 16 bits. In an embodiment, the cluster ID field comprises cluster ID information about the defect, and the fail value field comprises fail values for the defect. In an embodiment, the cluster ID is an ID assigned to a cluster of defects surrounding a group of original defects during a margining process. In an embodiment, the fail values can be values stored in a register for the disk drive 100 when the defect was detected. The fail values can include, for example, the reported error codes when the disk drive 100 attempts to read data from or write data to the disk 106.

The chunk 114f comprises record fields such as a counter field, a fail ID field, a process test module ("PTM") index field, a PTM count field, and a reserved field. In an embodiment, the counter field comprises 4 bits, the fail ID field comprises 8 bits, the PTM index field comprises 5 bits, the PTM count field comprises 3 bits, and the reserved field comprises 12 bits. In an embodiment, the reserved field is reserved in case additional information is required for any of the record fields. For example, if the defect process were modified such that the PTM count field requires 4 bits instead of 3 bits, then the bit usage can be taken from the reserved field. In addition, if the defect process were modified such that an additional record field is utilized, then the bits required for the additional field can be taken from the reserved field.

In an embodiment, the fail ID field defines information about a failed value. For example, the fail ID field can indicate what type of fail value is indicated in the fail value field. In an embodiment, failure analysis on the disk 106 can be performed based at least partly on the fail ID field. In an embodiment, the fail ID field can provide precise debug information for each Extended Error Code ("EEC") reported. In an embodiment, the fail ID field can provide defect distribution information based on the fail value logged.

In an embodiment the PTM index field identifies a PTM used to identify a defect corresponding to the defect record 112. In an embodiment, the PTM count identifies a number of passes of the same PTM used for the identification of the defect corresponding to the defect record 112. For example, the PTM count may identify whether it was a first pass, a second pass, or other number of passes of the same PTM that logged the defect corresponding to the defect record. In an embodiment, the PTM index field and the PTM can indicate whether there is a newly introduced defect and/or degradation. For example, if the PTM count indicates that it was the second pass of the same PTM that identified the defect, then there may be a newly introduced defect and/or degradation since the first pass of the same PTM. In an embodiment, the PTM comprises a read defect management and a write defect management.

While each of the word comprises 32 bits in the examples disclosed above, in an embodiment, each of the word comprises 64 bits. Similarly, while each of the defect records 112 comprises 24 bytes in the examples disclosed above, in an embodiment, each of the defect records 112 comprise 48 bytes. In an embodiment, the number of the bits in the record fields can be varied, but can still be arranged such that the chunks which comprise the record fields are still word aligned. In an embodiment, the record fields are arranged based on commonly associated features. For example, the cylinder field, the defect wedge field, and the process status field are grouped together in chunk 114a because they are commonly used for searching purposes and may form, for example, a key. Similarly, the defect start field and the defect end field are grouped in the chunk 114c because the defect start field is commonly used with the defect end field.

However the record fields need not be arranged in the specific chunks disclosed above. In an embodiment, the cluster ID field may be moved to the chunk 114f, while the fail ID field, PTM index, and PTM count field may be moved to the chunk 114e. Thus, in an embodiment, the record fields may be rearranged. In addition, in an embodiment, some of the record fields may be removed or changed. Also, in an embodiment, new record fields may be added.

Figure 5:
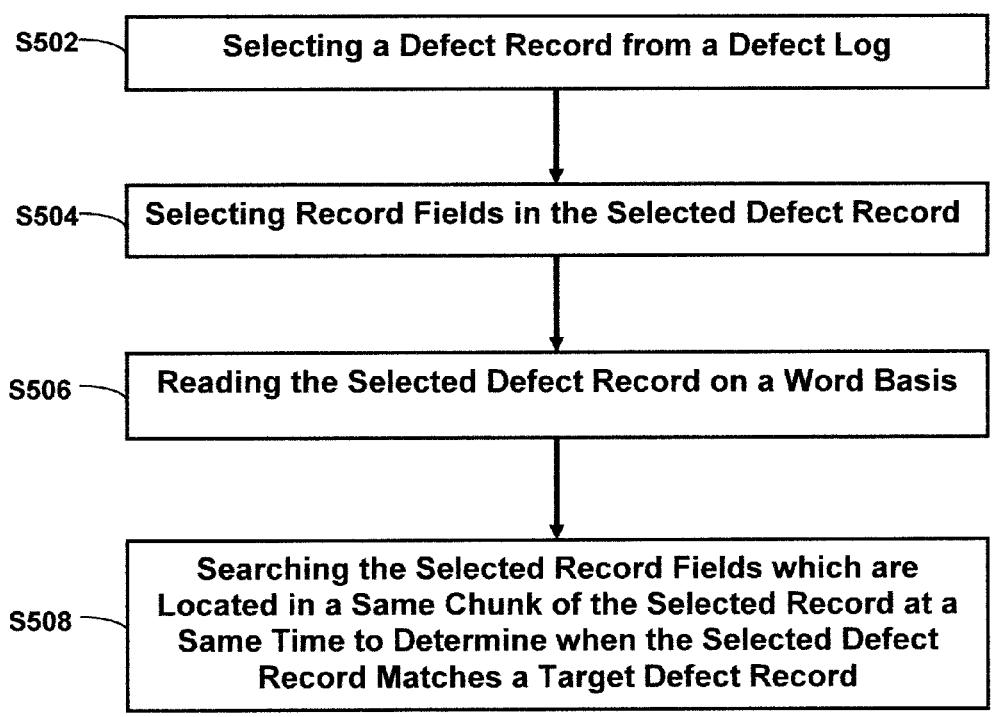
FIG. 5 depicts a process according to an embodiment.

In an embodiment, the defect process firmware 108 is loaded onto the memory 104. The defect process firmware 108, when executed, causes the controller 102 to perform a defect process on the disk drive 100 as disclosed in an embodiment in FIG. 5. In an embodiment, the defect process determines when a target defect record matches a defect record 112 in the defect log 110. In an embodiment, the defect process is used before and/or after disk formatting. In an embodiment, the defect process is used at a factory which manufactures the disk drive 100.

In block S502, the controller 102 selects a defect record 112 from the defect log 110. In block S504, the controller 102 selects record fields in the selected defect record. For example, the controller 102 selects which of the record fields it wants to utilize to search for a target defect record. In block S506, the selected defect record is read on a word basis. Thus, the controller 102 can read one or more words of the defect record 112.

For example, if the controller 102 wanted to utilize the cylinder field, the defect wedge field, and/or the process status field for searching the defect records 112 in the defect log 110, the controller 102 would read the chunk 114a, which is word aligned with word 1. However, if the controller 102 wanted to utilize the start wedge field, the end wedge field, and/or the record type field instead of the cylinder field, the defect wedge field, or the process status field, the controller 102 would read the chunk 114b, which is word aligned with word 2, instead of the chunk 114a, which is word aligned with word 1.

In block S508, the controller 102 searches the selected record fields which are located in a same chunk of the selected record at a same time to determine when the selected defect record matches the target defect record. For example, if the selected record fields are the cylinder field, and the defect wedge field, then the record fields would be located in the same chunk 114a. In such a case, the controller 102 searches the cylinder field and the defect wedge field at the same time to determine when the selected defect record matches the target defect record. In an embodiment, this can reduce a search time required to determine when one or more defect records 112 in the defect log matches the target defect record.

In an embodiment, the controller 102 reads only a single word from the selected defect record, and determines when the selected defect record matches the target defect record based on the single word read from the selected defect record. For example, the controller 102 can read just the chunk 114a, which is word aligned with word 1, to determine when the selected defect record matches the target defect record. In an embodiment, this can reduce a search time required to determine when one or more defect records 112 in the defect log 110 matches the target defect record.

In an embodiment, the controller 102 performs failure analysis using one or more of the disclosed record fields. In an embodiment, the controller 102 can sort some or all of the defect records 112 in the defect log based on one or more of the disclosed record fields.

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a non-transitory machine readable medium causing a processor or computer to perform or execute certain functions.

To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, an optical disk, or any other form of storage medium known in the art. An exemplary storage medium is coupled to the processor such that the processor can read information from, and write information to, the storage medium. In the alternative, the storage medium may be integral to the processor. The storage and the storage medium may reside in an Application Specific Integrated Circuit (ASIC).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A magnetic data storage device comprising:
    a magnetic data storage disk configured to store a defect log comprising one or more defect records of defects on the disk, wherein each of the defect records spans multiple words and comprises chunks that are word-aligned, at least one of the chunks comprising one or more record fields; and
    a controller configured to read the defect records on a word basis and configured to select a single chunk with which to search the defect records for a target defect record, and to search record fields located in the selected single chunk at a same time to determine whether the target defect record matches a defect record in the defect log.

2. The magnetic data storage device of claim 1 wherein each of the chunks has a same bit size as a bit size of a word, and wherein each of the chunks comprises one or more record fields.

3. The magnetic data storage device of claim 1 wherein the record fields comprise a record type field.

4. The magnetic data storage device of claim 1 wherein the record fields comprise a defect type field and a defect flag field.

5. The magnetic data storage device of claim 4 wherein the defect type field is a multiplexed field specifying a flag field definition.

6. The magnetic data storage device of claim 1 wherein the record fields comprise a fail ID field defining information about a failed value.

7. The magnetic data storage device of claim 1 wherein the record fields comprise a process status field identifying when a defect record corresponds to a defect that was not physically detected on the disk.

8. The magnetic data storage device of claim 7 wherein the process status field comprises a single bit.

9. The magnetic data storage device of claim 1 wherein the record fields comprise a process test module index identifying a process test module used to identify a defect corresponding to the defect record, and a process test module count identifying a number of passes of a same process test module used for the identification of the defect corresponding to the defect record.

10. The magnetic data storage device of claim 1 wherein each word comprises 32 bits.

11. The magnetic data storage device of claim 1 wherein each word comprises 64 bits.

12. The magnetic data storage device of claim 1 wherein each of the defect records comprises 24 bytes.

13. The magnetic data storage device of claim 1 wherein each of the defect records comprises 48 bytes.

14. A method, comprising:
    performing a defect process on a magnetic data storage device comprising a controller and a magnetic data storage disk storing a defect log comprising one or more defect records of defects on the magnetic data storage disk, wherein each of the defect records spans multiple words and comprises chunks that are word-aligned, wherein each of the chunks has a same bit size as a bit size of a word, and wherein each of the chunks comprises one or more record fields, by selecting a defect record from the defect log;

selecting record fields in the selected defect record;

reading only a single word from the selected defect record on a word basis; and searching the selected record fields that are located in a same chunk of the selected record at a same time to determine when the selected defect record matches a target defect record based on the single word read from the selected defect record.

15. The method of claim 14 wherein the record fields comprise a record type field.

16. The method of claim 15 further comprising performing failure analysis on the magnetic data storage disk based at least partly on the record type field.

17. The method of claim 14 wherein the record fields comprise a defect type field and a defect flag field.

18. The method of claim 17 further comprising performing failure analysis on the magnetic data storage disk based at least partly on the defect type field and the defect flag field.

19. The method of claim 18 wherein the defect type field is a multiplexed field specifying a flag field definition.

20. The method of claim 14 wherein the record fields comprise a fail ID field defining information about a failed value.

21. The method of claim 20 further comprising performing failure analysis on the magnetic data storage disk based at least partly on the fail ID field.

22. The method of claim 14 wherein the record fields comprise a process status field identifying when a defect record corresponds to a defect that was not physically detected on the magnetic data storage disk.

23. The method of claim 22 wherein the process status field comprises a single bit.

24. The method of claim 14 wherein the record fields comprise a process test module index identifying a process test module used to identify a defect corresponding to the defect record, and a process test module count identifying a number of passes of a same process test module used for the identification of the defect corresponding to the defect record.

25. The method of claim 14 wherein each word comprises 32 bits.

26. The method of claim 14 wherein each word comprises 64 bits.

27. The method of claim 14 wherein each of the defect records comprises 24 bytes.

28. The method of claim 14 wherein each of the defect records comprises 48 bytes.

* * * * *